G. H. DAY.
TRIAL FRAME.
APPLICATION FILED MAR. 27, 1915.
1,245,884.
Patented Nov. 6, 1917.
2 SHEETS—SHEET 1.
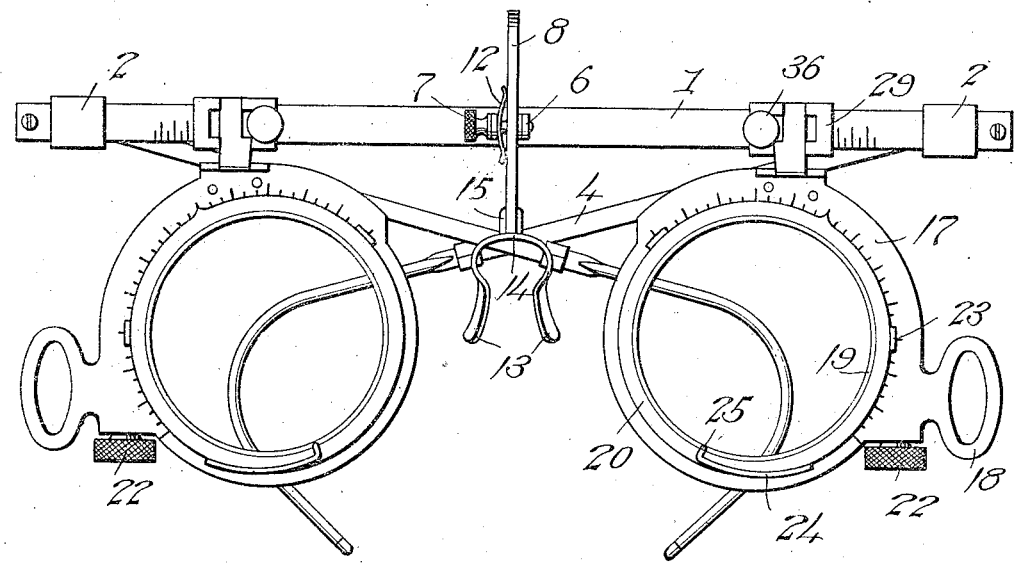
Fig. 1.
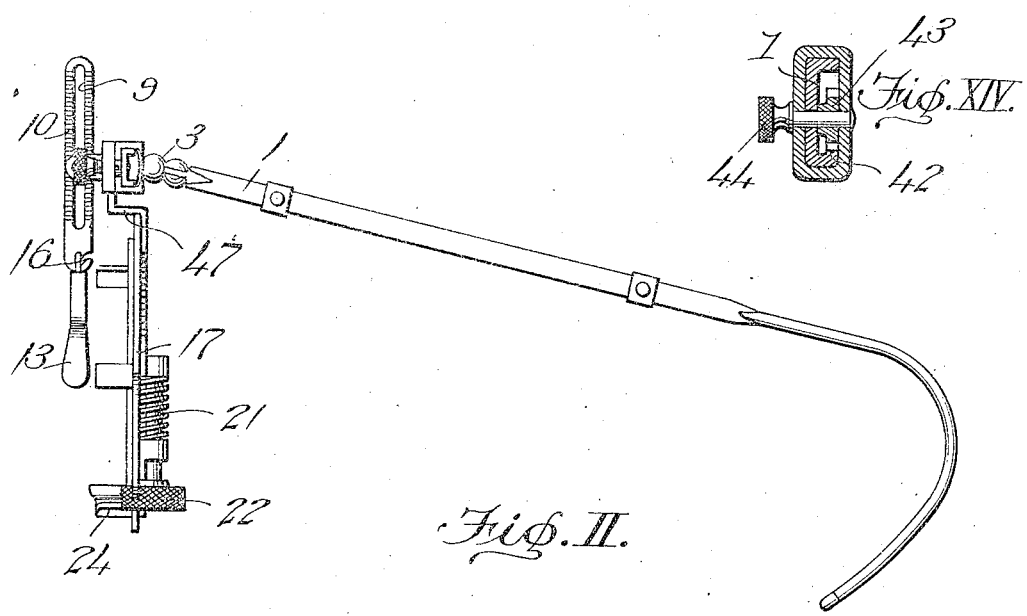
Fig. II.
Fig. XV.
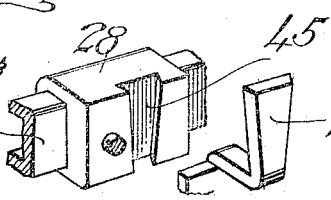
WITNESSES:
Joseph J. Demer
Samuel Bailey
INVENTOR
George H. Day,
BY
H. H. Styll   A. K. Parsons
ATTORNEYS

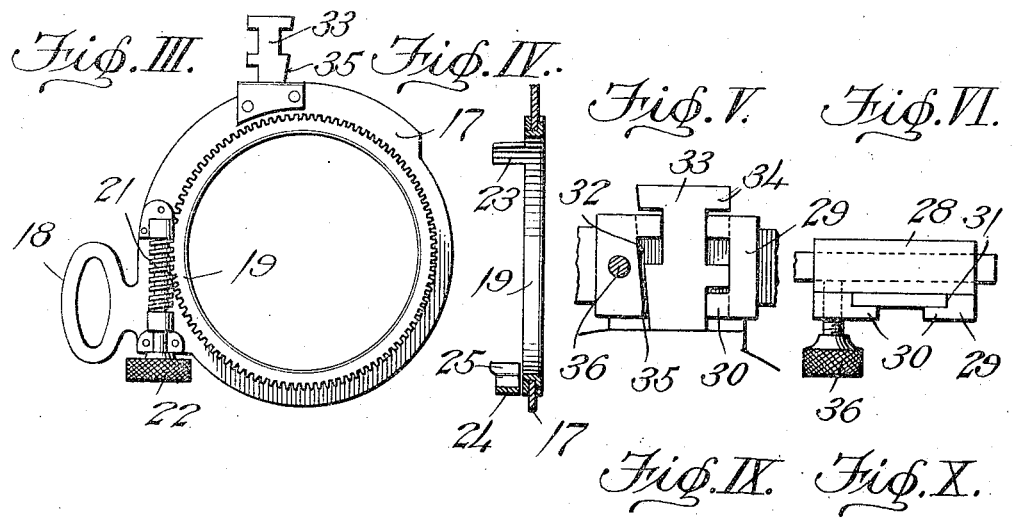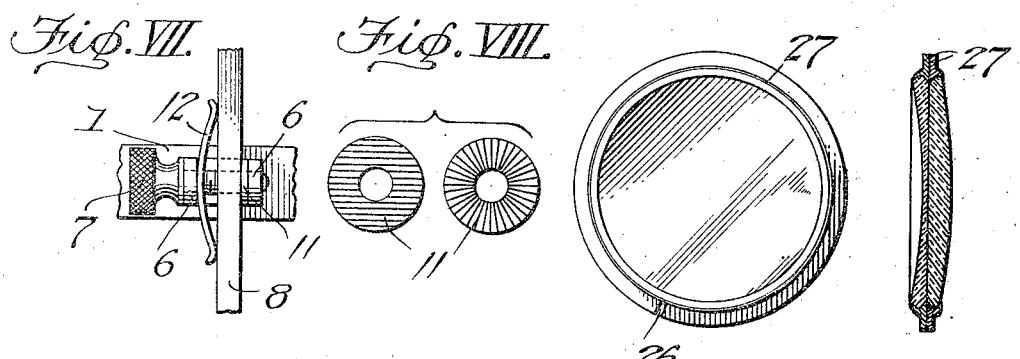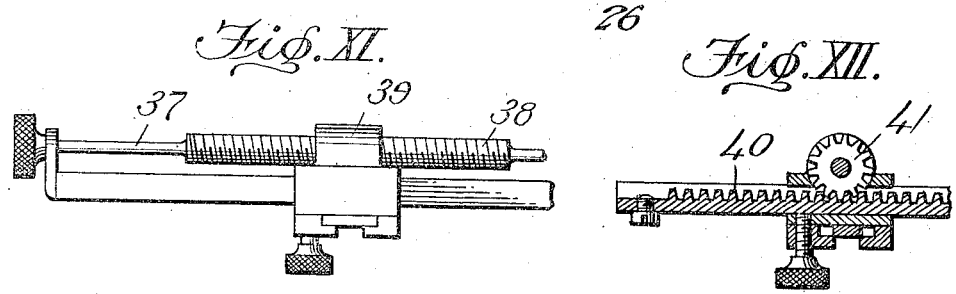

UNITED STATES PATENT OFFICE.

GEORGE H. DAY, OF SOUTHBRIDGE, MASSACHUSETTS, ASSIGNOR TO AMERICAN OPTICAL COMPANY, OF SOUTHBRIDGE, MASSACHUSETTS, A VOLUNTARY ASSOCIATION OF MASSACHUSETTS.

TRIAL-FRAME.

1,245,884.     Specification of Letters Patent.     Patented Nov. 6, 1917.

Application filed March 27, 1915. Serial No. 17,428.

*To all whom it may concern:*

Be it known that I, GEORGE H. DAY, a citizen of the United States, residing at Southbridge, in the county of Worcester and State of Massachusetts, have invented certain new and useful Improvements in Trial-Frames, of which the following is a specification.

This invention relates to improvements in instruments for use in testing eyes, and has particular reference to that type of instrument commonly termed a "trial frame."

The objects of the invention are to provide an instrument universal in its adaptations to the comfort and facial characteristics of the patient and to the requirements of the operator; to provide an instrument that is readily adaptable to the various systems of eye testing in vogue, such as the dioptric and the vertex; to provide an instrument in which many and various kinds of fittings and appliances may be readily adapted and applied; to provide an instrument in which the patient may be relieved of part of the weight at desired times; to provide an instrument which will insure that the lens system used in testing the eyes will be reproduced exactly in the lenses made for the patient from the test, and to provide an instrument wherein the operator may make his adjustments and apply his lenses either on the face of the patient or removed therefrom.

With these and other objects in view, the invention consists in the novel features of construction, combination and arrangement of parts, as will be hereinafter more fully described, illustrated in the accompanying drawings, and claimed.

In the drawings:

Figure I is a front elevation of a trial frame showing the temples in folded position.

Fig. II is a side elevation.

Fig. III is a rear elevation of one of the lens cells.

Fig. IV is a vertical sectional view through one of the lens cells.

Fig. V is a detail view showing the manner of attaching the lens cells to the supporting bar.

Fig. VI is a plan view of the structure disclosed in Fig. V.

Fig. VII is a detail view of the means for obtaining adjustment of the nose rest.

Fig. VIII is an inner and outer face view respectively of the locking washer.

Fig. IX is a front elevation of one of the trial lenses.

Fig. X is a transverse sectional view showing the manner in which the lenses are placed together.

Fig. XI is a plan view showing a modified form of adjusting means for the lens cell.

Fig. XII is a horizontal sectional view showing a further modified form of adjusting means for the lens cell.

Fig. XIII is a detail horizontal sectional view of the improved temple supporting slide.

Fig. XIV is a transverse sectional view showing a still further modified form of means for adjusting the cell slide.

Fig. XV is a detail perspective view illustrating the manner in which a modified form of cell supporting means may be constructed.

Referring to the drawings by numerals, wherein is illustrated the preferred embodiment of my invention, the numeral 1 designates the usual longitudinally extending supporting bar which, as may be desired, may be made in channel form, as illustrated in the drawings, or may be made in any other manner, as best suits the purpose for which it is constructed.

Improved means have been illustrated whereby longitudinal adjustment of the temples may be accomplished upon the supporting bar 1. Slides 2 are mounted on the bar 1, adjacent each end thereof, and have extending rearwardly therefrom suitable lugs 3 to which are pivotally connected the inner ends of the temples 4, the lugs 3 being angularly disposed with respect to the bar 1 so that the temples when extended lie at an angle thereto, as particularly illustrated in Fig. II, thus causing the frame to assume a more nearly correct angular relation to the face of the patient when the temples are properly engaged on the patient's ears.

I have shown the temples as being extensible, but do not wish to limit myself to this particular construction as it is to be understood that any desired type of temple may be used in connection with the improved frame. The slides 2 are adjustable upon the bar 1 by simply moving the same along the bar by means of the hand. In order to retain the slides in any adjusted position, I have placed a flat spring 5 between the slides 2 and the inner face of the bar 1, the spring being curved and normally acting to exert a pressure against the inner face of the slide and the inner face of the bar 1 so as to retain the slides 2 in any position in which they may be placed upon the bar 1.

Spring lugs 6 are formed on or secured to the outer face of the bar 1 intermediate the ends thereof and have alined apertures, one of which is threaded, to receive a screw 7, the said screw passing freely through one of the apertures and being threaded in the other so that when the same is turned the lugs will be sprung together for a purpose which will presently appear.

An arm 8 having a longitudinally extending slot 9 formed therein is placed between the lugs 6, with the screw 7 passing through the said slot 9. One face of the arm 8 is scored, as illustrated at 10, and is adapted to have bearing thereagainst the correspondingly scored face of a washer 11, the washer being disposed between the scored face of the arm 8 and the adjacent inner face of the lugs 6, the opposite face of the washer being radially scored, as clearly shown in Fig. VIII of the drawings, and being adapted to bear against the correspondingly scored inner face of the lugs 6. A flat spring 12 is placed between the opposite side of the arm 8 and the inner face of the other lug, and is adapted to normally exert a tension to force the arm against the washer 11 and the other lug 6. Adjustment of the arm is accomplished by simply releasing the screw 7, which releases the tension of the spring 12, and sliding the arm vertically by reason of its slotted connection with the screw 7, or swinging the same laterally, as will be understood. The screw 7 is then tightened, which tightening will again tension the spring 12 and force the scored faces of the washer 11 into engagement with the scored faces of the arm 8 and the lugs 6 respectively, the horizontally disposed scoring on the arm serving to prevent any accidental vertical movement of the arm while the radially disposed scoring serves to prevent any accidental lateral movement of the arm.

It has been found advisable to provide a set of nose rests or guards for the lower end of the arm 8. Each of these rests comprises a pair of guard members 13 which are connected at their upper ends by means of the spring loops 14, the spring loops providing for the automatic adjustment of the guards 13 upon the nose of the wearer, as will be obvious. A hook 15 is carried by the upper face of the portion 14 and is adapted to be placed within a slot 16 formed in the lower terminal end of the arm 8 when it is desired to apply the rest to the arm; the said slot 16 opens into one side of the arm 8, is curved downwardly and then upwardly to provide a seat for the hook 15 and to provide means whereby accidental disengagement of the guard is reduced to a minimum.

An important feature of the present invention resides in the improved construction of lens cells. Each of these cells comprises a body portion 17 preferably formed from sheet metal and being substantially circular in shape, and having extending from one side thereof the usual finger-piece or manipulating portion 18. A circular aperture is formed in each of these portions and is adapted to have rotatably mounted therein the inwardly extending flange of a gear wheel 19, a ring 20 being soldered or otherwise suitably secured to the projecting portion of the flange and abutting the face of the portion 17 opposite to that upon which the gear is arranged to provide a rigid and freely movable lens supporting member, rotation of the said gear or lens supporting member being obtained through the medium of a worm gear 21 mounted upon the rear face of the body portion 17 and engaging the teeth of the gear 19, a knurled finger wheel 22 being provided for rotating the said worm. By providing a worm gear for operating the gear 19 it will be apparent that minute adjustment of the lens supporting member may be accomplished, and that accidental rotation of the lens supporting member will be prevented by reason of the engagement of the teeth of the gear with the worm.

The ring 20 has lugs 23 formed thereon and against which the edges of the lens frame are adapted to bear, a spring arm 24 having an inwardly bent tongue 25 formed thereon, being formed on and extending laterally from the said ring 20, as is clearly shown in the drawings. This tongue 25 is adapted to be engaged with any alined pair of slots 26 formed in the edge of the lens frame 27 to hold the lenses in a position so that their axes will be in alinement and to prevent accidental rotation of the same when the same are applied within the lens supporting member.

By reason of the improved lens supporting means set forth it will be apparent that I am enabled to form a set of trial lenses, each of which will have at least one plain surface, so that any two lenses may be placed with their plane faces together and a true optical engagement provided therebetween. This feature is most clearly disclosed in Fig. X of the drawings, and it will be readily apparent that the plano concave and plano convex lenses may be made in true corresponding powers, as has been impossible heretofore, since allowance has had to be made for the distance ordinarily lying between the two lenses.

Another important feature of my invention is to provide a set of lens cells, any one of which may be applied to the supporting bar as occasion may demand. A slide member 28 is mounted upon the bar 1 and has the front face thereof provided with a pair of outwardly extending members 29 having over-hanging lips 30 formed thereon to provide the grooves 31. Two members 29 are provided, one of which is provided with an angularly disposed face 32, while the other has all of its faces extending in the same general plane. A tongue 33 may be formed as an integral part of the body portion 17, or may be constructed from a separate piece and attached, as shown in the drawings, and comprises an upwardly extending portion having ears 34 formed thereon and being provided at one side with an angularly disposed face corresponding to the angular face of the member 29. This tongue is adapted to be placed into engagement with the slide 28, as shown in Fig. V of the drawings, and then forced downwardly so that the ears 34 will lie beneath the overhanging loops 30 to prevent accidental disengagement of the tongue from the slide. At the same time the tongue is forced downwardly, the beveled edge 35 of the same engages the beveled edge 32 of the member 29 and holds the same rigidly in its applied position. When it is desired to remove the cell it is only necessary to raise the tongue slightly and disengage the same from the slide. In the preferred construction, a screw 36 is threaded into the slide 28 and is adapted to engage the bar 1 for locking the slide in any adjusted position.

Although I have shown and described the screw 36 as the preferred means for locking the slide in any longitudinally adjusted position upon the bar 1, I do not wish to limit myself to this particular method of adjusting the slide as other and in some cases probably more satisfactory results may be attained by other means of adjustment.

Fig. XI shows a modified form of adjusting means for the cell slide which comprises a rod 37 provided with a screw threaded portion 38 passing through an offset portion 39 on the slide, whereby turning of the rod will adjust the slide longitudinally of the bar, it being understood that the rod extends throughout the length of the bar and is provided with right and left hand threads so that turning movement in one direction will move the slides away from each other, while movement in the opposite direction will draw the same together.

In Fig. XII there has been illustrated another manner in which the slide may be adjusted longitudinally of the bar. In this form the bar is provided with ratchet teeth 40 which are engaged by a pinion 41 mounted on the slide so that turning movement of the pinion will cause the slide to move longitudinally of the bar.

In Fig. XIV, I have shown another modified form of adjusting means for the slide, in which the bar 1 is provided with an upturned flange 42 having teeth formed thereon to be engaged by a pinion 43 mounted upon an actuating stem 44 carried by the slide 28, so that turning movement of the stem will cause the pinion 43 to engage the teeth of the flange 42 and thus move the slide longitudinally upon the bar 1.

In Fig. XV, I have shown a modified form of means for detachably connecting the cells with the slide 28. In this form an angularly extending slot 45 is formed in one face of the slide 28 and has dove-tail side walls to be engaged by the correspondingly shaped dove-tail side walls of the cell supporting tongue 46. The operation of applying or disengaging the tongue remains the same as in the preferred form, the dove-tail edges of the slot and tongue preventing disengagement of the tongue from the slot, as will be understood.

From the foregoing description taken in connection with the accompanying drawings, it is thought that it will be apparent that I have provided a trial frame which is extremely light in construction, the parts thereof being adapted for ready removal, and a frame in which the trial lenses are locked against accidental movement and in which the axes of the lenses may be determined at a glance, and placed in the frame in their correct positions. It is desired to have it further understood that the laterally extending portions 47 of the tongue 33 are adapted to be made in various lengths and mounted upon a set of cells, so that one cell may be removed and another applied quickly to meet the requirements of the various patients on which the frame is used.

It will be further understood that the slide 29 may be equipped with the spring 5 of the slide 2 instead of the screw 36 for retaining the slide in any adjusted position, and likewise the slide 2 may be provided with a screw 36 instead of the spring 5 for retaining this slide in any adjusted position, and that both the slides 2 and 29 may be either provided with the screws 36 or springs 5 for the purpose mentioned.

From the foregoing description taken in connection with the accompanying drawings, it is thought that the construction and operation of the same will be clearly understood, and while I have herein shown and described one specific form of my invention, I do not wish to be limited thereto except to such limitations as the claims may import.

I claim:

1. The combination with a trial frame lens cell having a spring finger at one side thereof provided with an inwardly deflected end, of a pair of trial rings or lens frames for use in connection with said cell, each of said lens frames having a lens mounted therein, plano as to one side, whereby the lenses may be placed substantially in optical contact one with the other and the outer edges of the lens frames having notches formed therein whereby the inwardly deflected ends of the spring finger may be engaged simultaneously in the notches of both frames to lock said frames together to form a single compound lens for testing purposes, substantially as and for the purpose described.

2. A lens frame for use in a trial frame cell having one face flush and forming a direct continuation of the adjacent face of the lens, the face of the lens and adjacent rim being continuous, whereby the parts may be placed in close engagement with a complementary lens and frame to make up a compound trial frame lens in which separation between the several elements is eliminated, substantially as illustrated.

3. A lens frame for use in a trial frame cell having one face flush and forming a direct continuation of the adjacent face of the lens, the face of the lens and adjacent rim being continuous, whereby the parts may be placed in close engagement with a complementary lens and frame to make up a compound trial frame lens in which separation between the several elements is eliminated, the edges of the main and complementary lens frames having notches formed therein to receive a locking member on the frame to prevent relative displacement of the lenses.

4. In a trial frame, the combination with a rotatable cell, of an intermeshing worm and gear for positively rotating the cell while locking it against accidental shifting movement, coöperating scale and indicator parts on the cell and frame for denoting the rotative adjustment of the cell, a positive latch member carried by the cell, and a plurality of lens frames bearing trial lenses mounted in the cell, each of said frames having a notch or recess formed in its edge and disposed in predetermined relationship to the axis of the lens mounted therein, the recesses of the several frames in the cell being adapted to receive the latch or keeper member of the cell whereby the several lenses are locked in the frame with their axes in predetermined relation to the cell and thus to the scale and indicator of the frame so that the indicator may serve to properly designate the axis of the combination mounted within the cell.

5. In a trial frame, lens supporting means, and a spring arm having a tongue formed thereon for engagement with a slit in the lens frame for preventing rotation of the said lens frame within said supporting means.

6. In a trial frame, lens supporting means, and a yieldable arm carried by said supporting means, said arm having a tongue formed thereon for engagement with a slit in the lens frame whereby the lens is rotated with said supporting means.

7. In a device of the character set forth, cells, lens supporting means rotatably mounted in said cells, a worm gear for rotating said supporting means, said worm gear serving as a locking means to prevent accidental rotation of the supporting means, and a tongue carried by said supporting means for engagement with slits in the lenses to prevent rotation of the lenses within said supporting means, the slits of the lenses being so arranged that when any two of the lenses are placed in the supporting means their optical axes will coincide.

8. In a trial frame, a supporting bar, slotted slides mounted on said bar, and cells having tongues carried thereon for engagement with said slotted slides whereby the same may be detached.

9. In a trial frame, a supporting bar, slotted slides mounted on said bar, cells having tongues carried thereon for engagement with said slotted slides, said tongues being so arranged that movement in one direction will detach said cells and movement in the other direction will attach the cells.

10. In a trial frame, a supporting bar, slides mounted on said bar, said slides being provided with slots having angular faces, cells having tongues for engagement with said slots, said tongues having angular faces for engagement with the angular faces of the slots.

11. In a trial frame, a supporting bar, slides mounted on said bar, said slides being provided with slots, each of said slots having an angular face, lips overhanging said slots, cells having tongues formed thereon for engagement with said slots, each of said tongues being provided with an angular face for engagement with the angular face of the slot, ears formed on said tongues to lie beneath said lips to prevent accidental disengagement of the tongues from the slots, and means whereby the slide may be locked in any adjusted position on said bar.

In testimony whereof I affix my signature in presence of two witnesses.

GEORGE H. DAY.

Witnesses:
CARROLL BAILEY,
JOSEPH J. DEMERZ.

Copies of this patent may be obtained for five cents each, by addressing the "Commissioner of Patents, Washington, D. C."